Jan. 6, 1942.  W. C. ELLIS  2,268,862
VERTICAL CONVEYER
Filed Feb. 10, 1940  3 Sheets-Sheet 1
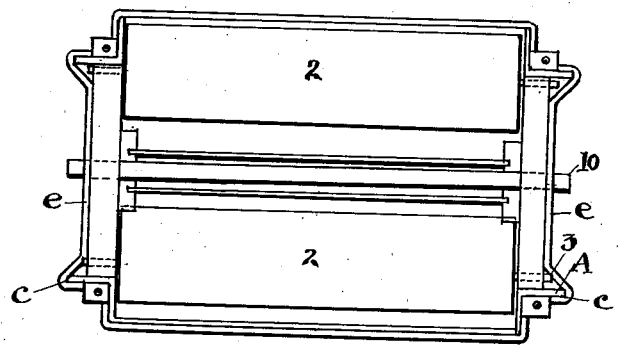
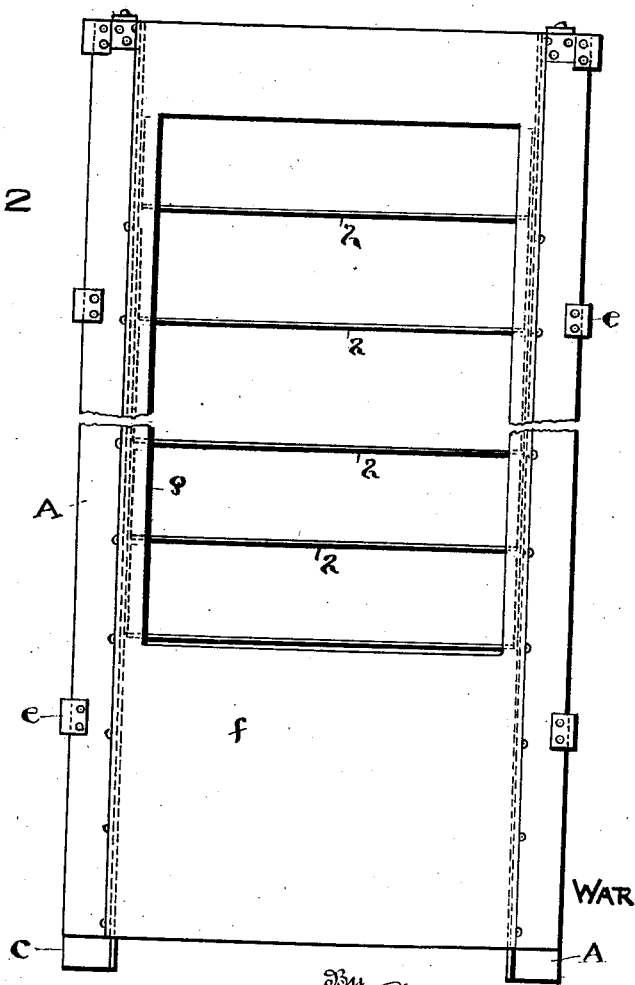
Inventor
WARREN C. ELLIS
By Edward M. Fisher
Attorney Jan. 6, 1942.  W. C. ELLIS  2,268,862
VERTICAL CONVEYER
Filed Feb. 10, 1940  3 Sheets-Sheet 2
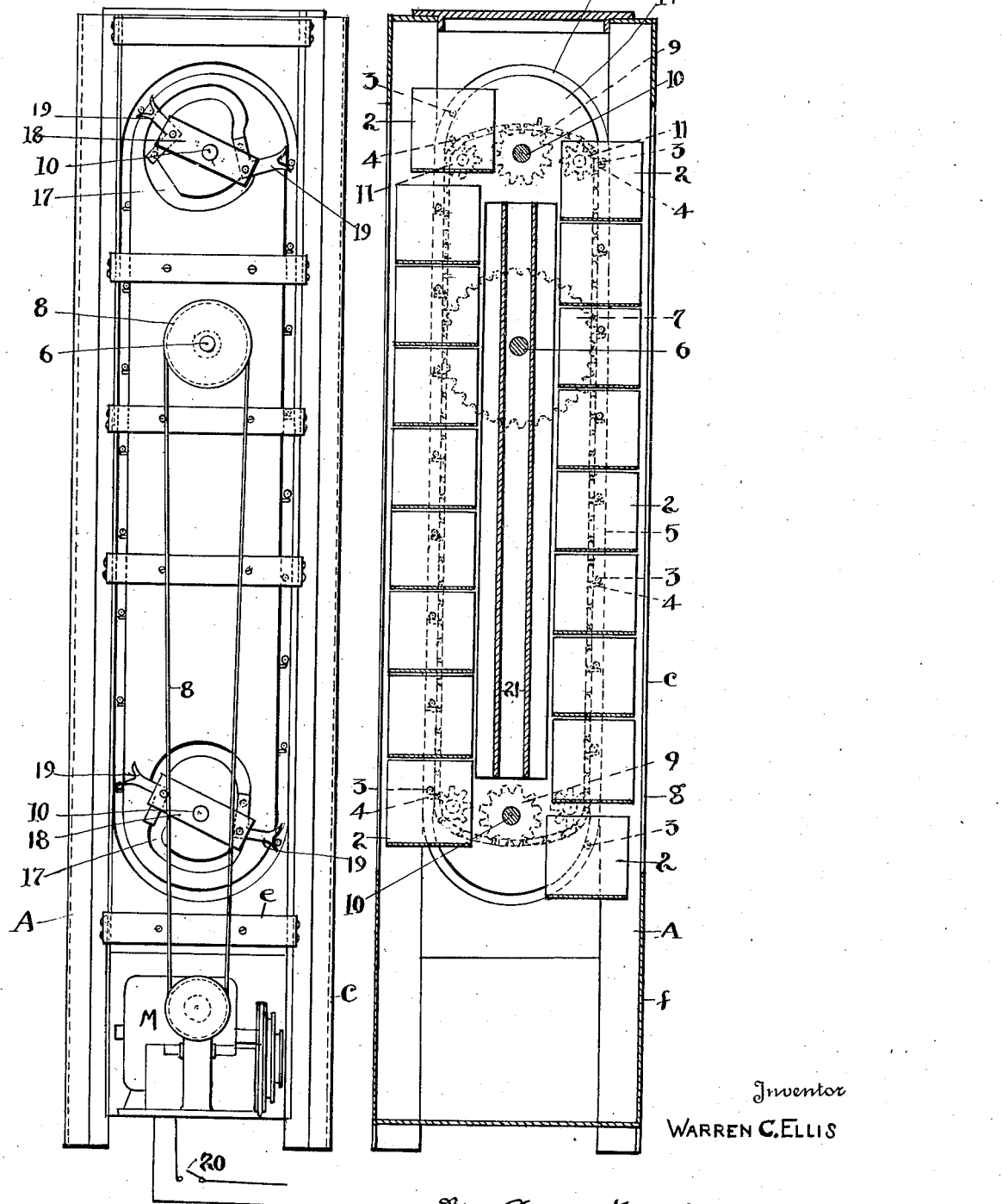
Inventor
WARREN C. ELLIS
By Edward M. Fisher
Attorney Jan. 6, 1942. W. C. ELLIS 2,268,862
VERTICAL CONVEYER
Filed Feb. 10, 1940 3 Sheets-Sheet 3

Inventor,
WARREN C. ELLIS
by Edward M Fisher
Atty.

Patented Jan. 6, 1942

2,268,862

UNITED STATES PATENT OFFICE 2,268,862

VERTICAL CONVEYER

Warren C. Ellis, St. Petersburg, Fla.

Application February 10, 1940, Serial No. 318,355

14 Claims. (Cl. 198—137)

This invention is concerned with the provision of a vertical conveyer by means of which a carrier, in the form of a shelf, drawer, or the like, may be conveyed to a desired horizontal plane in said conveyer.

Broadly it is an object of this invention to provide a vertical conveyer of the type which consists generally of a frame which may be suitably encased, a plurality of carriers, such as shelves, drawers and the like, horizontally disposed within the vertical uprights of said frame, means for conveying said carriers to desired horizontal position, means permitting retainment of said carriers in a horizontal plane during conveying operation and an arrangement of structure permitting the loading and unloading of said carriers.

This invention resides substantially in the combination, arrangement and relative location of parts all in accordance with the disclosure herein.

In the accompanying drawings,

Fig. 1 is a top plan view of a conveyer in accordance with this invention.

Fig. 2 is a front elevational view thereof.

Fig. 3 is a side elevational view thereof.

Fig. 4 is a sectional view, with motor removed, on line 4—4 Fig. 1.

Figure 5:
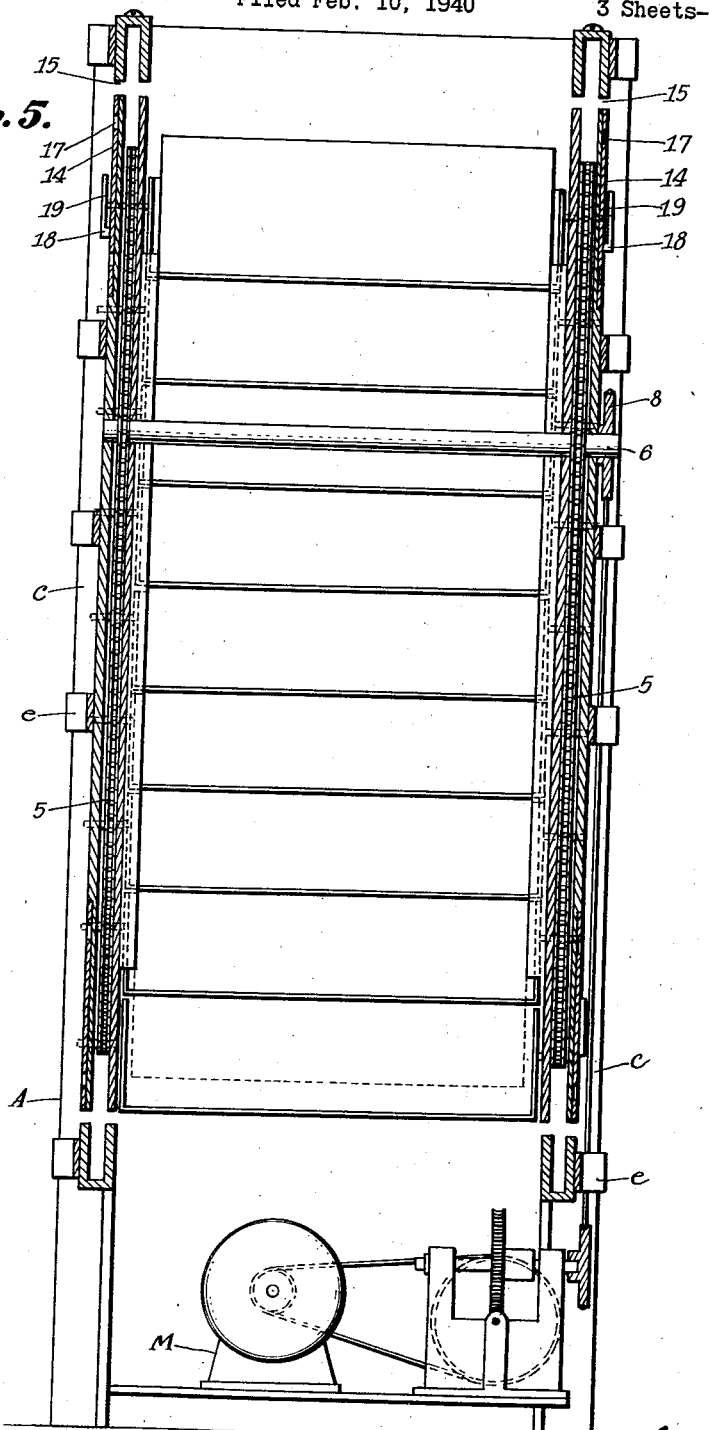
Fig. 5 is a sectional view on line 5—5 Fig. 1.

The true nature and manner of use of a conveyer in accordance with this invention will be best understood by detailed description of the form thereof shown in the drawings in an illustrative sense.

This conveyer includes a frame A which is preferably as shown, in the form having uprights c tied together by cross members e and face frame plates f which have openings g, and within the scope of said frame are a plurality of horizontally positioned carriers 2 opposite ends of said carriers having stub shafts 3, provided with roller bearings, adapted to be engaged by spaced and laterally extended finger members 4 of endless sprocket chains 5 for vertical travel of said carriers, and extended therebeyond to permit engagement of said shafts 3 with rotary carriage means.

Centrally transversing said apparatus between and extended beyond the opposite sides thereof is a drive shaft 6 having keyed or otherwise secured thereon at opposite end portions thereof sprocket wheels 7 and upon the extreme outer portion of one end of said shaft is a belt pulley 8.

In vertical alinement with said sprocket wheel 7 and approaching the top and bottom portions of said apparatus are sprocket wheels 9 secured to shafts 10.

To each side of sprocket wheels 9 and centered in a plane slightly below the shaft 10 are idler wheels 11.

Each train of sprocket wheels and idlers are connected by a sprocket chain 5 and, when said apparatus is in use, rotated through the drive shaft 6 by motive power transmitted to the belt pulley 8, thereby forming means for vertical travel of the carriers which, as above stated are engageable with the chains through lateral projected portions 4.

Outward from and adjacent to the chain actuated members are obrotund core plates 14 forming the inner portion of a track 15 through which the shafts 3 are projected for contact with eccentric carrier transfer means.

Integral with opposite end portions of core plates 14 are cam tracks 17 which function with rotary arm bars 18, said bars being in rotatable engagement with the rotatable shaft 10 and therethrough rotated corelatively with the vertical carriage mechanism. Said bars 18 have flexible fingers 19, each finger being in the form of a right angle, one leg of the angle having a roller bearing which is in engagement with and follows the cam tracks 17, the other leg having a claw end for engagement with shaft member 3.

Referring to the drawings, especially Fig. 4, the distance of travel between opposite guideways for the carriers, after leaving the vertical carriage mechanism, at the top and bottom of the apparatus is approximately twice that traveled by the vertical carriage mechanism in its travel between opposite guide ways. In order to absorb this difference of travel and maintain a means for continued travel of the carriers I provide the herein described eccentric mechanism whereby as the carriers approach the top or bottom of the apparatus and the end of the vertical travel in the direction they are being conveyed by means of the vertical travel mechanism, they are confronted by the claw ends of the fingers 19 engaging the outer end portions of the bearing shafts 3 and by rotatable eccentric mechanism, of which said fingers 19 form a part, conveyed from the vertical guide ways and mechanism, through and by which it has traveled to the point of contact with fingers 19, to the curved portion of the track 15 for travel therein, then urged by the eccentric mechanism through fingers 19 through said track to the opposite vertical guide way from whence it came and placed, by the eccentric mechanism herein described, in contact with the vertical carriage mechanism in said guide way for carriage therewith.

It is obvious that by the above described novel means of transfer of the carriers as between opposite guide ways that the lost space between carriers, and which appears to be essential in the structure of apparatuses of like nature, is absorbed thereby permitting the carriers to be placed in compact vertical order as shown in the drawing as well as allowing the structure of the vertical end pieces or portions of the carriers to be square as shown in the drawings, round or any other suitable shape or form without carrier interference, one with another, as they are transferred from and to opposite vertical guide ways. During the within described operation of carrier transfer the carriers are maintained in a horizontal position by gravity.

Control of movement of said carrier is through a switch 20 interposed between the motor M and source of power supply or other suitable means.

While the function and mechanism of the apparatus is not dependent on a partition as shown at 21 it is considered that as a protective means for the contents of the carriers such a structure is of value.

Illuminating means for said apparatus is not shown but same may be accomplished by a simple installation of luminous units.

Each apparatus as herein described and shown is complete within itself but if desired may be used as a unit in the installation of a plurality of units therefore I have elected not to show or describe any special casing as this would depend greatly upon the use of the apparatus, in fact an apparatus might be installed in such manner that a casing would not be desired, for example, as a built in feature.

From the above description it is apparent to those skilled in the art that the details of construction illustrated herein may readily be varied without departure from the novel subject matter herein disclosed. I do not, therefore desire to be strictly limited by the disclosure but rather by the claims granted me.

What is claimed is:

1. An apparatus of the kind described comprising a frame having vertical guide ways including stretches adjacent to opposite sides of said frame, conveyer mechanism common to said guide ways, a series of independently movable carriers for travel in said guide ways and acted upon by the conveyer mechanism for movement thereby and accessible from opposite sides of said frame, mechanism for imparting motion to the conveyer, means cooperating with the carriers for sustaining the same in a horizontal position during travel thereof at determined points of the guide way, and means confined within the frame for confronting the outermost portions of the respective carriers during travel thereof for the transfer of the carriers to vertical carriage mechanism in opposite guide ways.

2. An apparatus of the kind described comprising a frame having vertical guide ways including stretches adjacent to opposite sides of said frame, conveyer mechanism common to said guide ways, a series of independently movable carriers for travel in said guide ways and acted upon by the conveyer mechanism for movement thereby and accessible from opposite sides of said frame, mechanism for imparting motion to the conveyer, means cooperating with the carriers for sustaining the same in a horizontal position during travel thereof, means confined within the frame for confronting the outermost portions of the respective carriers at predetermined points during travel thereof, for transfer of carriers to vertical mechanism in opposite vertical guide way and an endless chain included in said conveyer mechanism and having projections for engaging the carriers to support the same when moved vertically by the said conveyer mechanism.

3. An apparatus of the kind described comprising a frame having vertical guide ways including stretches adjacent to opposite sides of said frame, conveyer mechanism common to said guide ways, a series of independently movable carriers for travel in said guide ways and acted upon by the conveyer mechanism for movement thereby and accessible from opposite sides of said frame, mechanism for imparting motion to the conveyer, means cooperating with the carriers for sustaining the same in a horizontal position during travel thereof, at determined points of the guide way, means confined within the frame for confronting the intermost portions of the respective carriers during travel thereof throughout a major extent of the guide way therefor, an endless chain included in the vertical conveyer mechanism and having projections for engaging the carriers to support the same when moved by the said conveyer mechanism and eccentric mechanism correlative to and coacting with the vertical conveyer mechanism for the operation of the eccentric mechanism in coacting with the carriers for their transfer to opposite guide ways and vertical conveyer mechanism.

4. An apparatus of the kind described comprising a support having vertical guide ways and return guide ways uniting said vertical guide ways, a plurality of vertically movable carriers following said guide ways, and conveyer mechanism for said carriers and active thereon for independent movement of the same, and eccentric means following the return guide ways for transfer of the carriers to the opposite vertical guide ways and mechanism therein.

5. An apparatus of the kind described comprising a support having vertical guide ways and return guide ways uniting said vertical guide ways, a plurality of vertically movable carriers following said guide ways, conveyer mechanism for said carriers and active thereon for independent movement of the same, and eccentric means following the return guide ways for transfer of the carriers to the opposite vertical guide ways and mechanism therein, and a power unit for said conveyer mechanism.

6. An apparatus of the kind described comprising a support having vertical guide ways and curved guide ways connecting opposite vertical guide way, a plurality of vertically movable carriers following said vertical guide ways, conveyer mechanism for said carriers and active thereon for independent movement of the same, and eccentric means following the return curved guide ways for transfer of the carriers to guide ways opposite those in which said carriers have vertically traveled, a power unit for said conveyer mechanism and means for sustaining the carriers each in a horizontal position during travel thereof in the guide ways.

7. An apparatus of the kind described comprising a support having vertical guide ways and curved guide ways connecting opposite vertical guide ways, a plurality of vertically movable carriers following said guide ways, conveyer mechanism for said carriers and active thereon for independent movement of the same, and eccentric means following the return curved guide ways for transfer of the carriers to vertical carriage mechanism in guide ways opposite those in which the carriers have vertically traveled, a power unit for said conveyer mechanism, means for sustaining the carriers each in a horizontal position during travel thereof in the guide ways and an open front provided in said support for giving access to the said carriers.

8. An apparatus of the kind described comprising a support having vertical guide ways and curved guide ways connecting opposite vertical guide ways, a plurality of vertically movable carriers following said vertical guide ways, vertical conveyer mechanism for said carriers and active thereon for independent movement of the same, and eccentric mechanism following the curved guide ways for transfer of the carriers to vertical carriage mechanism in guide ways opposite the guide ways in which the carriers have vertically traveled, a power unit for said conveyer mechanism, means for sustaining the carriers each in a horizontal position during travel thereof in the guide ways, an open front provided in said support for giving access to the said carriers, and an endless chain included in said conveyer mechanism and having vertical stretches arranged for parallel travel with relation to each other in a vertical direction.

9. An apparatus of the kind described comprising a support having vertical guide ways and guide ways connecting opposite vertical guide ways, a plurality of vertically movable carriers following said guide ways, conveyer mechanism for said carriers and active thereon for independent movement of the same, and eccentric mechanism following the guide ways connecting said opposite vertical guide ways for transfer of the carriers from and to vertical carriage mechanism in said opposite vertical guide ways, a power unit for said conveyer mechanism, means for sustaining the carriers each in a horizontal position during travel thereof in the guide ways, an open front provided in said support for giving access to the said carriers, an endless chain included in said conveyer mechanism and having vertical stretches arranged for parallel travel with relation to each other in a vertical direction and means on the said chain for engaging the carriers independently of each other.

10. An apparatus of the kind described comprising a support having vertical guide ways and guide ways connecting opposite vertical guide ways, a plurality of vertically movable carriers following said guide ways, conveyer mechanism for said carriers and active thereon for independent movement of the same, and eccentric mechanism following the connecting guide ways for transfer of the carriers from and to vertical carriage mechanism in opposite vertical guide ways, a power unit for said conveyer mechanism, means for sustaining the carriers each in a horizontal position during travel thereof in the guide ways, an open front provided in said support for giving access to the said carriers, an endless chain included in said conveyer mechanism and having vertical stretches arranged for parallel travel with relation to each other in a vertical direction, means on the said chain for engaging the carriers independently of each other and means within the support for effecting a backing to the carriers throughout a major portion of the vertical travel thereof.

11. In an apparatus of the kind described having a plurality of guideways, a movable carrier following said guideways, conveyer mechanism having driving means for said carrier and active thereon for movement of the same, and rotary means comprising a rotatable cam arm coactive with said conveyer mechanism for transfer of the carrier as between the guideways and conveyer mechanism correlated therewith.

12. In an apparatus of the kind described having a plurality of guideways, a movable carrier following said guideways, conveyer mechanism having driving means for said carrier and active thereon for movement of the same, and rotary carrier transfer means coactive with said conveyor mechanism and correlated therewith.

13. In an apparatus of the character described having a plurality of guideways, a movable carrier following said guideways, driven conveyer mechanism for said carrier and means for transfer of the carrier as between opposite guideways comprising a rotatable cam arm formed to contact the outermost portions of the carrier during travel and transfer thereof.

14. In an apparatus of the character described having a plurality of guideways, a movable carrier following said guideways, driven conveyer mechanism for said carrier and means for transfer of the carrier as between opposite guideways comprising eccentric mechanism correlated to and coacting with the conveyer mechanism.

WARREN C. ELLIS.